United States Patent
Gokmen (10) Patent No.: US 11,574,196 B2
(45) Date of Patent: Feb. 7, 2023

(54) DYNAMIC MANAGEMENT OF WEIGHT UPDATE BIT LENGTH

(71) Applicant: International Business Machines Corporation, Armonk, NY (US)

(72) Inventor: Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 16/596,716

(22) Filed: Oct. 8, 2019

(65) Prior Publication Data
US 2021/0103821 A1  Apr. 8, 2021

(51) Int. Cl.
*G06N 3/08* (2006.01)
*G06N 3/04* (2006.01)
*G06N 3/063* (2006.01)

(52) U.S. Cl.
CPC .......... *G06N 3/084* (2013.01); *G06N 3/0472* (2013.01); *G06N 3/0635* (2013.01)

(58) Field of Classification Search
CPC ..... G06N 3/084; G06N 3/0472; G06N 3/0635
See application file for complete search history.

(56) References Cited

U.S. PATENT DOCUMENTS

| 9,646,243 | B1 | 5/2017 | Gokmen |
| 9,735,200 | B2 | 8/2017 | Wells et al. |
| 9,900,788 | B2 | 2/2018 | Kim et al. |
| 2009/0049417 | A1 | 2/2009 | Kinoshita et al. |
| 2017/0212791 | A1 | 7/2017 | Laskowski |
| 2017/0359082 | A1 | 12/2017 | Riedel et al. |

FOREIGN PATENT DOCUMENTS

| JP | 2000059791 | 2/2000 |
| JP | 2001052341 | 2/2001 |

OTHER PUBLICATIONS

Doi et al., Bit length optimization of fractional part on floating to fixed point conversion for high-level synthesis, IEICE Transactions On Fundamentals Of Electronics Communications And Computer Sciences, vol. E86A, No. 12, pp. 3184-3191, 2003 (1 Page Abstract).
Doi et al., Bit-Length Optimization Method for High-Level Synthesis Based on Non-linear Programming Technique, IEICE Trans. Fundamentals, vol. E89-A, No. 12, Dec. 2006, pp. 3427-3434.

(Continued)

*Primary Examiner* — Paulinho E Smith
(74) *Attorney, Agent, or Firm* — Kristofer Haggerty; Otterstedt & Kammer PLLC (57) ABSTRACT

Machine learning is enhanced by efficiently updating a weight that is represented as a conductivity of a resistive processing unit (RPU) that is connected between a row wire and a column wire. The weight is updated by the RPU interacting with bit streams carried on the row and column wires. Efficiency of the update is enhanced by calculating a bit length for the bit streams as a function of factors that include learning rate $\eta$, maximum activity $x_{max}$, maximum error differential $\delta_{max}$, and minimum weight update increment $\Delta w_{min}$.

20 Claims, 5 Drawing Sheets

(56) References Cited

OTHER PUBLICATIONS

Gokmen et al., Acceleration of Deep Neural Network Training with Resistive Cross-Point Devices: Design Considerations, Frontiers in Neuroscience, Original Research, published Jul. 21, 2016, vol. 10, Article 333, 13 pages doi: 10.3389/fnins.2016.00333.
Gokmen et al., Training Deep Convolutional Neural Networks with Resistive Cross-Point Devices, Frontiers in Neuroscience, Original Research, published: Oct. 10, 2017, vol. 11, Article 538, 13 Pages doi: 10.3389/fnins.2017.00538.
Burr et al., "Experimental demonstration and tolerancing of a large-scale neural network (165,000 synapses), using phase-change memory as the synaptic weight element". IEEE Transactions on Electron Devices. Jul. 2015. vol 62 (11). pp. 3498-3507.
Wikipedia, "Stochastic computing," Jun. 2019, 5 pages. https://en.wikipedia.org/wiki/Stochastic_computing.
Chen, "Designing Accurate and Low-Cost Stochastic Circuits," University of Michigan, Jun. 2016. 155 pages. https://deepblue.lib.umich.edu/bitstream/handle/2027.42/133255/tehsuan_1.pdf.
Mell et al., "The NIST Definition of Cloud Computing". Special Publication 800-145. NIST. Sep. 2011, 7 pages.

DYNAMIC MANAGEMENT OF WEIGHT UPDATE BIT LENGTH

BACKGROUND

The present invention relates to the electrical, electronic, and computer arts, and more specifically, to stochastic neural networks.

Neural networks are configurations of computer hardware and/or software that imitate the functioning of biological cells involved in cognition. In a neural network, the processors simulate thousands or millions of neurons, which are connected by axons and synapses. Each connection is assigned a weight that is reinforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Typically, neural networks are trained by a backpropagation algorithm in which training data is fed into the network at a front end and propagates "forward" through the network to a back end. The output of the network at the back end then is compared to an expected result, which is provided a priori by expert knowledge. An error differential between the output and the expected result is calculated and used to derive an error gradient. The error gradient then is propagated "backward" through the network (from back end toward front end) in order to update the weights assigned to each neuron's inputs. This process of forward and backward propagation is repeated to progressively reduce the error differential by iteratively updating the weights, until a desired value of error differential or a desired error rate (e.g., less than 3%) is achieved.

SUMMARY

Principles of the invention provide techniques for dynamic management of weight update bit length. In one aspect, an exemplary method for enhancing machine learning, by efficiently updating a weight that is represented as a conductivity $w_{ij}$ of a resistive processing unit (RPU) that is connected between a row wire and a column wire, includes receiving an activation $x_i$ at a first translator that powers the row wire and receiving an error $\delta_j$ at a second translator that powers the column wire; calculating a bit length BL as a function of factors that include learning rate $\eta$, maximum activity $x_{max}$, maximum error differential $\delta_{max}$, and minimum weight update increment $\Delta w_{min}$; calculating an activation scaling factor $C_x$ and an error scaling factor $C_\delta$ as functions of BL; scaling the activation $x_i$ in the first translator by the activation scaling factor $C_x$ and scaling the error $\delta_j$ in the second translator by the error scaling factor $C_\delta$; by operation of the first and second translators, translating the scaled activation $C_x x_i$ and the scaled error $C_\delta \delta_j$ into first and second bit streams having bit lengths BL; applying the first bit stream to the row wire and applying the second bit stream to the column wire; and adjusting the conductivity $w_{ij}$ of the RPU by interaction of the bit streams with the RPU.

In another aspect, an exemplary neural network apparatus includes a plurality of row wires that are powered by first translators that receive neuron activations $x_i$ as inputs and produce first bit streams as outputs, wherein the first bit streams have bit length BL that is calculated as a function of factors that include learning rate $\eta$ maximum activity $x_{max}$, maximum error differential $\delta_{max}$, and minimum weight update increment $\Delta w_{min}$; a plurality of column wires that are powered by second translators that receive errors $\delta_j$ as inputs and produce second bit streams as outputs, wherein the second bit streams also have bit length BL; and a plurality of resistive processing units (RPUs), each connected between one of the row wires and one of the column wires, each RPU storing a weight as a conductivity $w_{ij}$ of the RPU, wherein the conductivities $w_{ij}$ of the RPUs are adjusted by interaction of the first and second bit streams with the RPUs.

In another aspect, an exemplary method for operating a neural network that comprises a resistive processing unit (RPU) that is connected between a row wire and a column wire, includes receiving an activation $x_i$ at a first translator that powers the row wire and receiving an error $\delta_j$ at a second translator that powers the column wire; calculating a bit length BL as a function of factors that include learning rate q, maximum activity $x_{max}$, maximum error differential $\delta_{max}$, and minimum weight update increment $\Delta w_{min}$; calculating an activation scaling factor $C_x$ and an error scaling factor $C_\delta$ as functions of BL; scaling the activation $x_i$ in the first translator by the activation scaling factor $C_x$ and scaling the error $\delta_j$ in the second translator by the error scaling factor $C_\delta$; by operation of the first and second translators, translating the scaled activation $C_x x_i$ and the scaled error $C_\delta \delta_j$ into first and second bit streams having bit lengths BL; applying the first bit stream to the row wire and applying the second bit stream to the column wire; adjusting the conductivity $w_{ij}$ of the RPU by interaction of the bit streams with the RPU; and transmitting an input voltage to the RPU via the row wire and receiving an output current from the RPU via the column wire.

In view of the foregoing, techniques of the present invention can provide substantial beneficial technical effects. For example, one or more embodiments permit dynamically adjusting the bit length of weight update signals to enhance convergence of a neural network using resistive processing units.

Embodiments of the invention are generally useful for all machine learning applications. Particular embodiments enhance convergence of the machine learning solution by making weight updates faster. Some embodiments cause changes to the conductivity of the RPUs more quickly than previously known in the art.

One or more embodiments are advantageous for enhancing the convergence of machine learning problems such as weather forecasting (for more accurate forecasts), crop grading (for more efficient utilization of agricultural resources), or resource reservoir mapping (for more efficient utilization of resource extraction equipment).

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
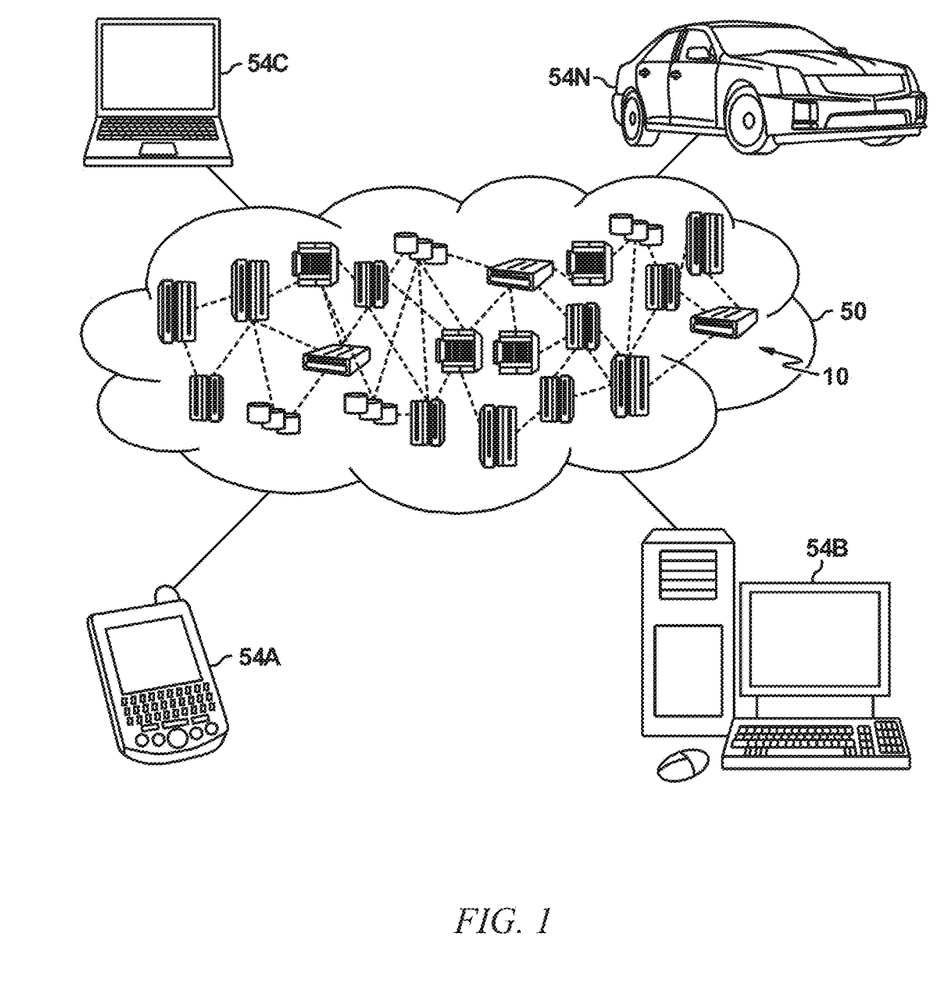
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
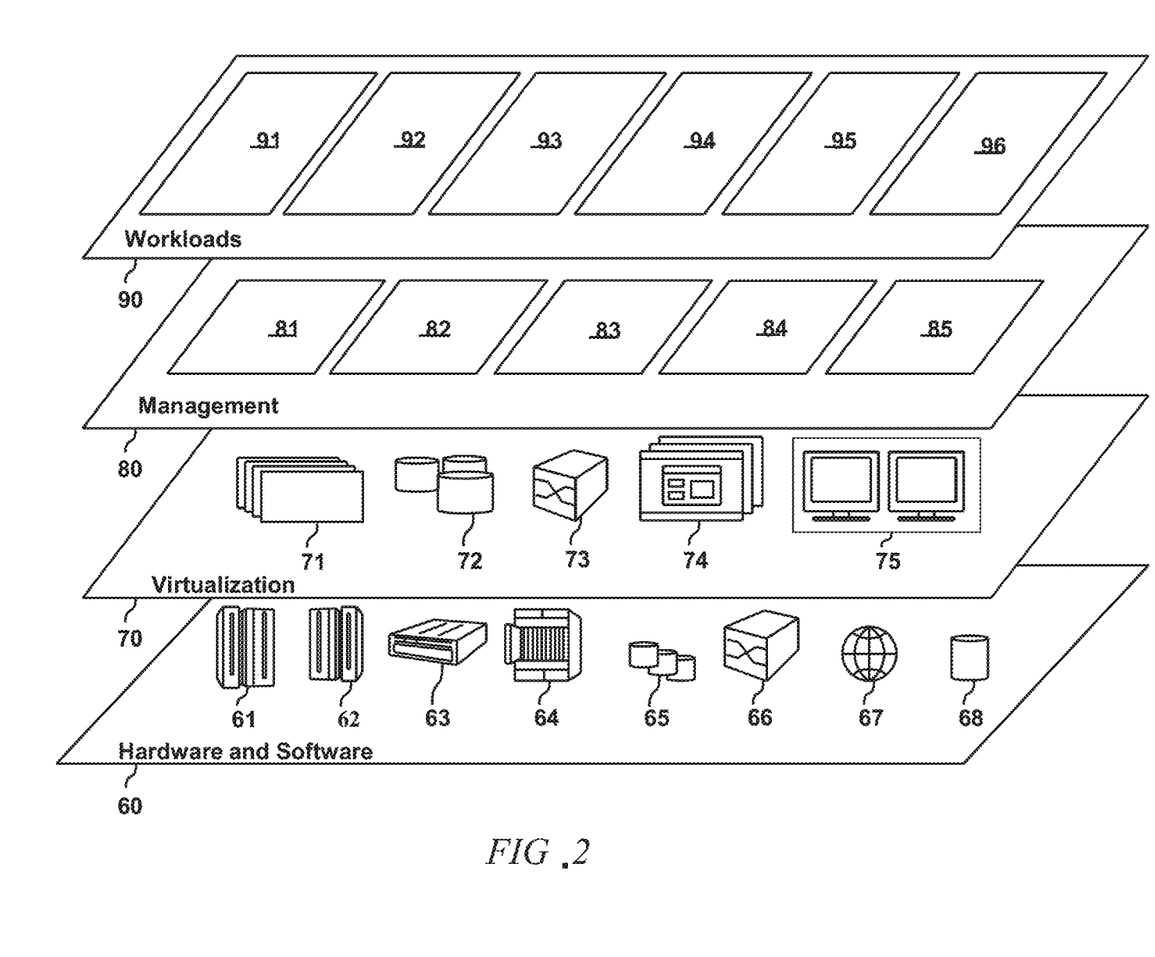
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a neural network 96.

Large deep neural networks can enable computer systems to accomplish tasks that are prohibitively difficult for humans or for conventionally programmed computers. Such tasks include, for example, real-time natural speech recognition and translation between all world languages; real-time analytics on large streams of business and scientific data; integration and analysis of multimodal sensory data flows from a massive number of IoT (Internet of Things) sensors; and the like. Training of large neural networks, however, is a time consuming and computationally intensive task that demands data-center-scale computational resources recruited for many days. The concept of resistive cross-point devices can potentially accelerate neural network training by orders of magnitude while using less computational power.

A neural network can be constructed using resistive processing units (RPUs), which act both as processors and as memories. Such an RPU-based neural network includes an RPU array, which includes a plurality of RPUs, and a processor configured to control electric voltage across the RPUs from the RPU array. The processor configures the RPU array corresponding to each layer of the neural network based on dimensions associated with that layer. The processor performs forward pass computations for the neural network via the RPU array by transmitting voltage pulses corresponding to input data of the layer to the RPU array, and storing values corresponding to output currents from the RPU arrays as output maps. The processor also performs backward pass computations for the neural network via the RPU array by transmitting voltage pulses corresponding to error of the output maps of the convolution layer to the RPU array, and storing values corresponding to the output currents from the RPU array as backward error maps. The processor also performs update pass computations for the neural network via the RPU array by transmitting to the RPU array voltage pulses corresponding to the input data and corresponding to the error of the output maps; interaction of these voltage pulses with the RPUs automatically updates weights of the RPUs in a manner that will be appreciated by the skilled worker.

Training a stochastic cross-point device (e.g., a resistive processing unit or RPU) is different from training a typical neural network processing unit. In an embodiment, a RPU is trained using a backpropagation method that includes three cycles, namely a forward cycle, a backward cycle, and a weight update cycle (herein "weight update" in short). The forward and backward cycles mainly involve computing vector-matrix multiplication in the forward and backward directions. One or more embodiments are essentially directed to the weight update. The weight associated with an RPU can be updated by a simple AND operation between two stochastic bit streams, one (e.g., on a column wire) representing the activity at the input to the RPU and the other (e.g., on a row wire) representing the error computed by the output neuron. Alternatively, deterministic bit streams can be used. When positive or negative bits coincide, the conductivity of the RPU is augmented or diminished accordingly, thereby adjusting the corresponding weight. Bit stream length determines the precision of the weight update to arbitrary exactitude. A stream with more bits brings the weight closer to its "true" value for correcting the error differential.

The number of pulses (bit stream length, or "BL") that is used for a weight update is a free parameter that can be set arbitrarily. Generally (but not always), increasing the bit stream length BL would increase the learning rate, while increasing BL would typically increase the update time.

Figure 3:
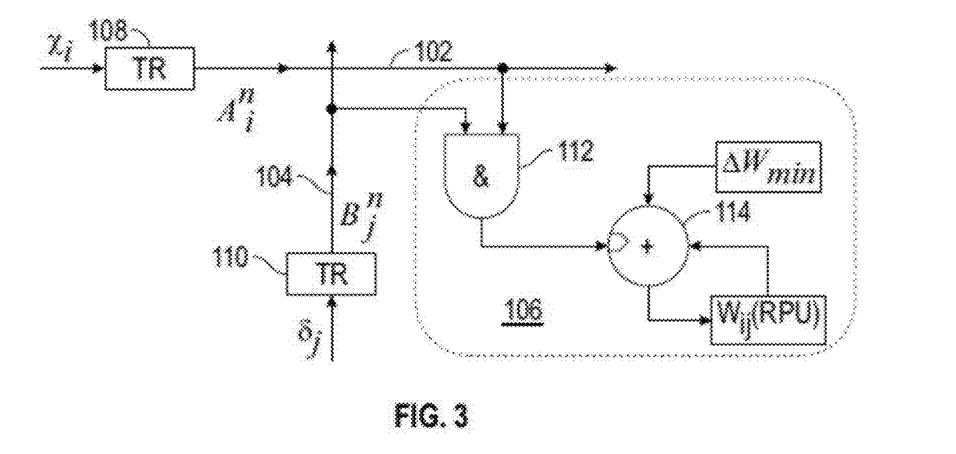
FIG. 3 depicts in a schematic an update rule circuit for use in a neural network, according to an exemplary embodiment.

FIG. 3 depicts in a schematic an update rule circuit 100 for dynamic management of update bit length, according to an exemplary embodiment. The circuit 100 includes a row wire 102, a column wire 104, and a cross-point device (RPU) 106. At the row wire 102, a first translator (TR) 108 converts a floating point value of neuron activity $x_i$ to a bit stream $A_i^n$ with bit length BL. At the column wire 104, a second translator 110 converts a floating point value of an error differential $\delta_j$ to a bit stream $B_j^n$ with bit length BL. The two bit streams $A_i^n$ and $B_j^n$ have equal bit lengths. For purposes of illustration, $A_i^n$ and $B_j^n$ will be discussed herein as stochastic bit streams; however, principles of the invention are equally applicable and can be implemented using deterministic bit streams in a manner understood by the skilled worker, given the teachings herein.

It will be apparent to the ordinary skilled worker, in view of FIG. 3, that the RPU 106 updates its stored value (i.e. its conductivity or weight $w_{ij}$) by ANDing the respective bit streams $A_i^n$ and $B_j^n$ for $x_i$ and $\delta_j$ as illustrated schematically by an AND gate 112. However, no such AND gate is required. Instead, the AND function is accomplished by the physics of the RPU 106. Thus, the RPU 106 effectively multiplies $x_i$ and $\delta_j$, then increments $w_{ij}$ by a minimum increment $\Delta w_{min}$ each time the bits of the two bit streams coincide (i.e. AND is true). The incremental function is represented schematically by an adder 114 that is triggered by the output of the AND gate 112; however, the RPU 106 accomplishes the incremental function without requiring an actual adder circuit. Thus, a stochastic update rule implemented by the system 100 is as follows:

$$w_{ij} \leftarrow w_{ij} + \Delta w_{min} \sum_{n=1}^{BL} A_i^n \wedge B_j^n$$

where $w_{ij}$ denotes a weight of a connection between an $i^{th}$ row and a $j^{th}$ column, $\Delta w_{min}$ denotes an incremental conductance change (i.e., change in weight value) due to a single coincidence event (and is considered a device parameter that may be controlled by voltage), BL denotes the length of the stochastic bit stream (at the output of the STRs that is used during the update cycle), $A_i^n$ and $B_j^n$ denote random variables that are characterized by a Bernoulli process, and the superscript n denotes the bit position in the trial sequence.

It turns out, unexpectedly, that different types of neural network (e.g., fully connected (FCN), convolutional (CNN), or long short term memory (LSTM)) update with optimal efficiency for different values of bit length. For example, a bit length (BL) 1 might be optimal for some networks (e.g., certain CNN) whereas BL>10 might be better for other networks (e.g., most FCN).

One approach to optimizing BL would be to try several different BL settings and see what works best for a given network and task. But this kind of trial-and-error hyperparameter adjustment is just one more thing that a practitioner needs to keep up with. Accordingly, it adds inefficiency into the training process. Preferably, hardware could estimate optimum BL on the fly to get the best network performance.

In one or more embodiments, a hardware or software system dynamically chooses a smallest acceptable value of BL to get the best performance from each update cycle. According to one or more embodiments, an optimum value for BL is established as a function of several factors including learning rate q, maximum activity $x_{max}$, maximum error differential $\delta_{max}$, and minimum weight update increment $\Delta w_{max}$. Generally, a function that produces an integer value from the above-mentioned factors could be suitable for determining a bit length.

For example, $$BL = \text{ceil}\left[\frac{\eta x_{max} \delta_{max}}{\Delta w_{min}}\right].$$

Figure 4:
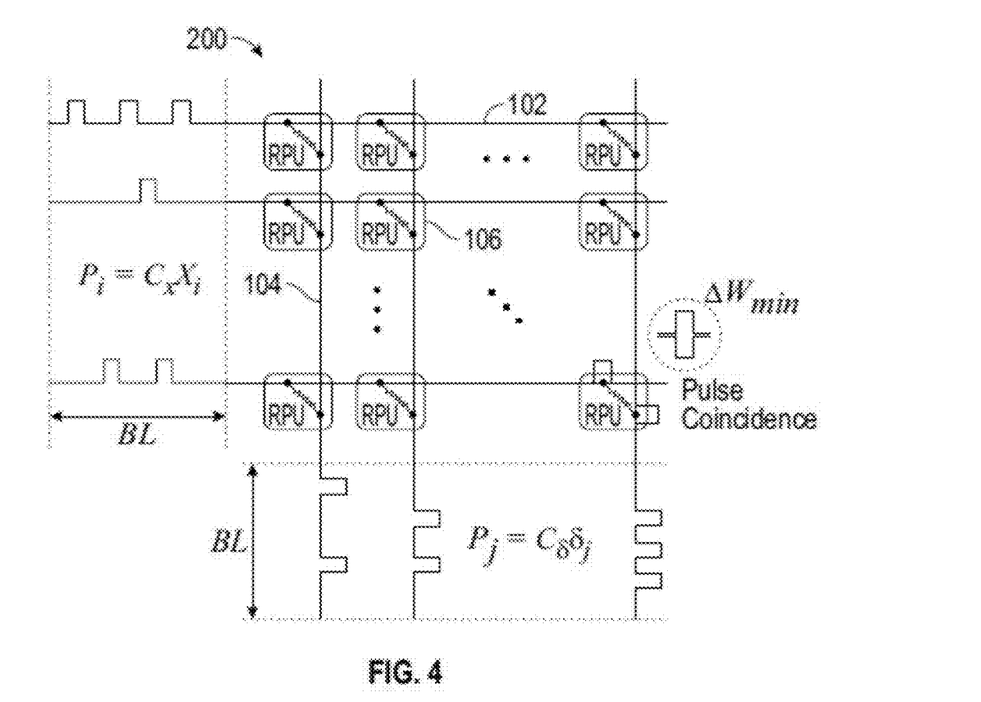
FIG. 4 depicts in a schematic an array of update rule circuits, according to an exemplary embodiment.

Further, referring to FIG. 4, it is apparent that for an array 200 of RPUs 106 there are many bit streams on many rows and columns. For each bit stream, a probability $P_i$ or $P_j$ is the likelihood of a high signal at each bit within the stream. In a naïve embodiment, the probabilities would be directly related to magnitudes of $\delta$ and x. However, the stochastic update rule (Coincidence Detection) works worse when the multiplicands are at different orders of magnitude (e.g., 1 and $10^{-6}$), which means that a probability of having a "high" pulse in individual populations is greatly different (i.e., one is more or less certain while the other is quite improbable). For example, when a $\delta$ column fires, then all the nodes in that column get updated since x rows certainly fire (have values of 1 or −1).

In order to alleviate the above-discussed problem, the multiplicands can be scaled relative to their respective orders of magnitude. In other words, as shown in FIG. 4, $P_i = C_x x_i$ and $P_j = C_\delta \delta_j$. Thus, G and are TR amplification factors that scale $x_i$ and $\delta_j$ to match their magnitudes, thereby avoiding a false spatial correlation that could otherwise arise from mismatched amplitudes (i.e. one of $x_i$ and $\delta_j$ is so much larger than the other, that its bit stream is uniformly high signals). In an embodiment, the amplification factors $C_x$ and $C_\delta$ are controlled by a non-linear filter. Generally, it is desirable in one or more embodiments to have $$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}}.$$

These values for BL, $C_x$ and $C_\delta$ optimize update bit length and amplification factors as functions of learning rate so that weight updates run fast and converge quickly. In addition, for the stochastic update rule, the change in the weight value for a single update cycle is bounded by BL $\Delta w_{min}$ and this condition may happen if the probabilities ($C_x x_i$) and ($C_\delta \delta_j$) of generating pulses from the TRs 108, 110 are close to unity or larger. The effect of this clipping in the weight update also is taken into account and does not degrade the performance for BL determined according to the above equation.

Figure 5:
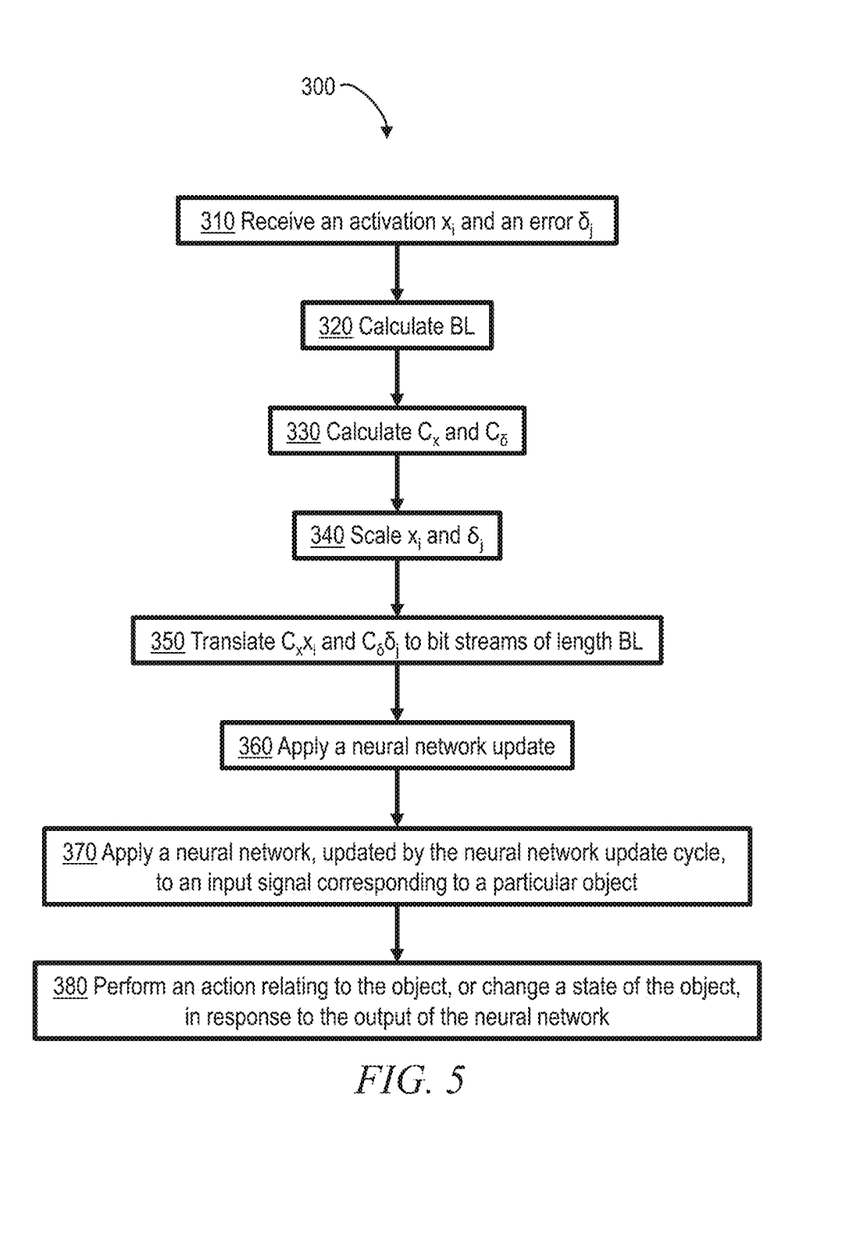
FIG. 5 depicts in a flowchart a method for weight update bit length management, according to an exemplary embodiment.

FIG. 5 depicts in a flowchart a method 300 for weight update bit length management in the RPU array 200, which is implemented according to an exemplary embodiment.

At 310, receive an activation signal (i.e. $x_i$) from an upstream (input) neuron and receive an error signal (i.e. $\delta_j$) from a downstream (output) neuron. At 320, calculate BL as above. At 330, calculate $C_x$ and $C_\delta$ as above. At 340, scale the signals ($x_i$ and $\delta_j$) using $C_x$ and $C_\delta$. At 350, translate, by a set of first and second TRs 108, 110, the scaled signals into bit streams (e.g., stochastic or deterministic bit streams), each having a respective Bit Length (BL) determined as above. At 360, apply a neural network update as discussed above with reference to FIG. 3. At 370, apply a neural network, updated by the neural network update cycle, to an input signal corresponding to a particular object. In one or more embodiments, the input signal includes the activation $x_i$. At 380, perform an action relating to the particular object, or change a state of the particular object (to another state), based on an output of the neural network.

Given the discussion thus far, it will be appreciated that, in general terms, an exemplary method for enhancing machine learning, by efficiently updating a weight that is represented as a conductivity $w_{ij}$ of a resistive processing unit (RPU) 106 that is connected between a row wire 102 and a column wire 104, according to an aspect of the invention, includes several steps. One step is receiving an activation signal $x_i$ at a first translator 108 that powers the row wire and receiving an error signal $\delta_j$ at a second translator 110 that powers the column wire. Another step, contemporaneous, previous, or subsequent to receiving the activation signal, is calculating a bit length BL as a function of factors that include learning rate maximum activity $x_{max}$, maximum error differential $\delta_{max}$, and minimum weight update increment $\Delta w_{min}$. Another step is calculating an activation scaling factor $C_x$ and an error scaling factor $C_\delta$ as functions of BL. Another step is scaling the activation signal $x_i$ in the first translator by the activation scaling factor $C_x$ and scaling the error signal $\delta_j$ in the second translator by the error scaling factor $C_\delta$. Another step is, by operation of the first and second translators, translating the scaled activation signal $C_x x_i$ and the scaled error signal $C_\delta \delta_j$ into first and second bit streams having bit lengths BL. Another step is applying the first bit stream to the row wire and applying the second bit stream to the column wire, and adjusting the conductivity $w_{ij}$ of the RPU by interaction of the bit streams with the RPU.

In one or more embodiments, the first and second bit streams are stochastic.

In one or more embodiments, $$BL = \text{ceil}\left[\frac{\eta x_{max} \delta_{max}}{\Delta w_{min}}\right].$$

In one or more embodiments, $$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}}.$$

In one or more embodiments, the first and second bit streams are deterministic.

According to another aspect of the invention, an exemplary neural network apparatus includes a plurality of row wires 102, a plurality of column wires 104, and a plurality of resistive processing units (RPUs) 106. The row wires are powered by first translators 108 that receive neuron activation signals $x_i$ as inputs and produce first bit streams as outputs. The first bit streams have bit length BL that is calculated as a function of factors that include learning rate maximum activity $x_{min}$, maximum error differential $\delta_{max}$, and minimum weight update increment $\Delta w_{min}$. The column wires are powered by second translators 110 that receive error signals $\delta_j$ as inputs and produce second bit streams as outputs. The second bit streams also have bit length BL. Each of the RPUs is connected between one of the row wires and one of the column wires, and each RPU stores a weight as a conductivity $w_{ij}$ of the RPU. The conductivities $w_{ij}$ of the RPUs are adjusted by interaction of the first and second bit streams with the RPUs.

In one or more embodiments, the first and second bit streams are stochastic.

In one or more embodiments, the exemplary neural network apparatus also includes a processor 16 that calculates $$BL = \text{ceil}\left[\frac{\eta x_{max} \delta_{max}}{\Delta w_{min}}\right]$$

and transmits BL to the first and second translators.

In one or more embodiments, the processor also calculates an activation scaling factor $C_x$ and an error scaling factor $C_\delta$, $$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}},$$

transmits the activation scaling factor $C_x$ to the first translators and transmits the error scaling factor $C_\delta$ to the second translators, and the first translators scale the activations $x_i$ by the activation scaling factor $C_x$ before translating the scaled activation signals to the first bit streams, while the second translators scale the errors $\delta_j$ by the error scaling factor $C_\delta$ before translating the scaled error signals to the second bit streams.

In one or more embodiments, the first and second bit streams are deterministic.

According to another aspect of the invention, an exemplary method for operating a neural network that comprises a resistive processing unit (RPU) 106 that is connected between a row wire 102 and a column wire 104, includes receiving an activation $x_i$ at a first translator 108 that powers the row wire and receiving an error $\delta_j$ at a second translator 110 that powers the column wire. The method also includes calculating a bit length BL as a function of factors that include learning rate q, maximum activity $x_{max}$, maximum error differential $\delta_{max}$, and minimum weight update increment $\Delta w_{min}$. Additionally, calculating an activation scaling factor C and an error scaling factor $C_\delta$ as functions of BL, then scaling the activation $x_i$ in the first translator by the activation scaling factor $C_x$ and scaling the error $\delta_j$ in the second translator by the error scaling factor $C_\delta$. Additionally, by operation of the first and second translators, translating the scaled activation $C_x x_i$ and the scaled error $C_\delta \delta_j$ into first and second bit streams having bit lengths BL. Moreover, applying the first bit stream to the row wire and applying the second bit stream to the column wire, and adjusting the conductivity $w_{ij}$ of the RPU by interaction of the bit streams with the RPU. Finally, transmitting an input voltage to the RPU via the row wire and receiving an output current from the RPU via the column wire.

In one or more embodiments, the first and second bit streams are stochastic.

In one or more embodiments, the first and second bit streams are deterministic.

In one or more embodiments, $$BL = \text{ceil}\left[\frac{\eta x_{max} \delta_{max}}{\Delta w_{min}}\right].$$

In one or more embodiments, $$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}}.$$

In one or more embodiments, the activations and errors have floating point values.

Figure 6:
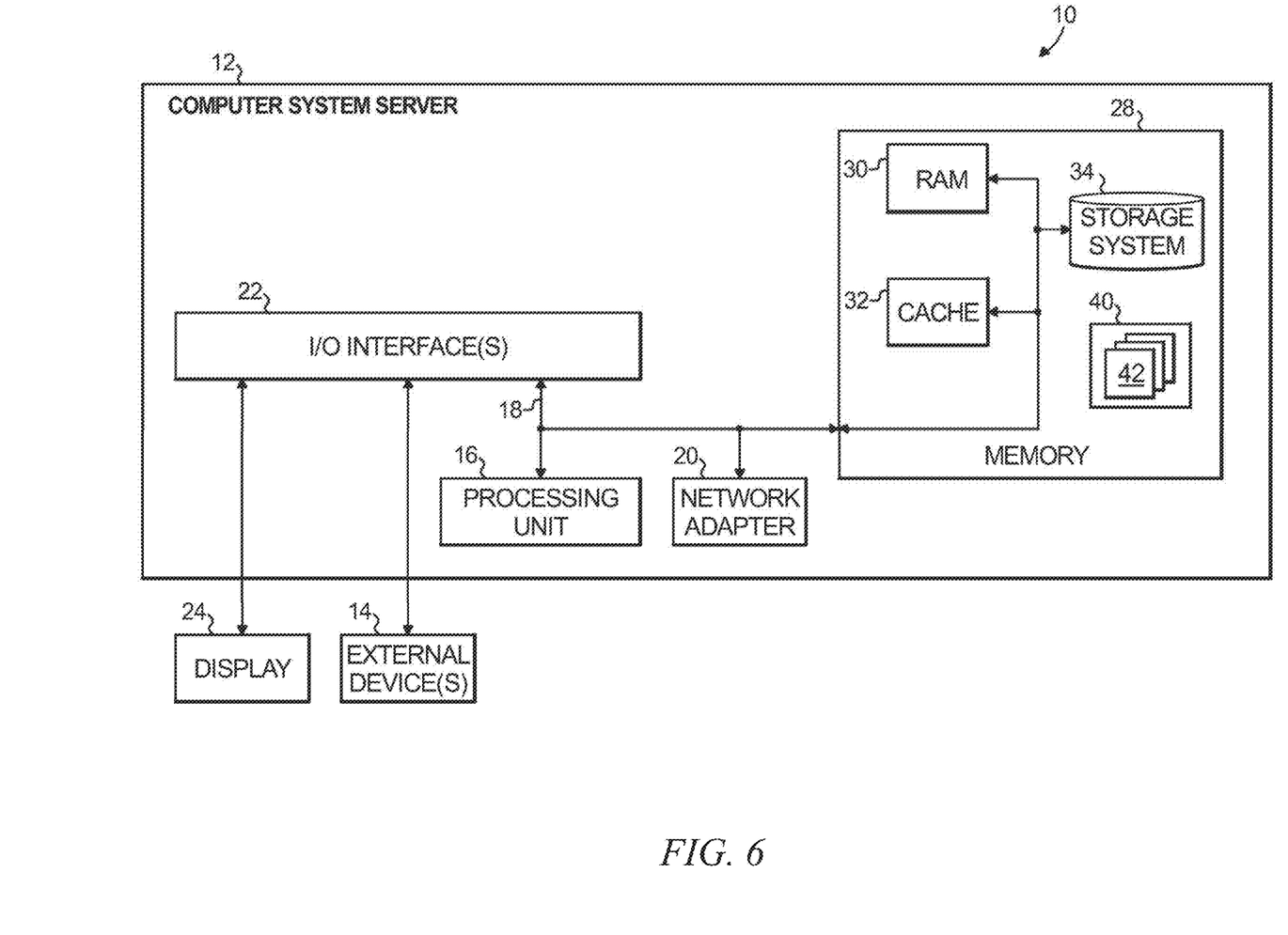
FIG. 6 depicts a computer system that may be useful in implementing one or more aspects and/or elements of the invention.

One or more embodiments of the invention, or elements thereof, can be implemented in conjunction with an apparatus including a memory and at least one processor that is coupled to the memory and operative to perform exemplary method steps, or in the form of a non-transitory computer readable medium embodying computer executable instructions, which when executed by a computer cause the computer to perform exemplary method steps. FIG. 6 depicts a computer apparatus (or cloud computing node) 10 that may be useful in implementing one or more aspects and/or elements of the invention.

The computer apparatus 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, etc.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or particularly the first and second translators 108, 110. The term "processor" as used herein is intended to include any processing device, such as, for example, one that includes a CPU (central processing unit) and/or other forms of processing circuitry. Further, the term "processor" may refer to more than one individual processor. As mentioned, the processor 16 interacts with the translators 108, 110 at least for the following purposes: (i) to program the translators with scaling factors for activations and weights, and (ii) to configure the translators to output bit streams of a bit length that the processor calculates from several factors. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation. The memory elements (system memory) 28 can store, among other things, input maps and output maps that are used in conjunction with the translators 108, 110 to operate a neural network comprising the row wires 102, column wires 104, and RPUs 106.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing machine learning by efficiently updating a weight that is represented as a conductivity $w_{ij}$ of a resistive processing unit (RPU) that is connected between a row wire and a column wire, the method comprising:
   receiving an activation signal at a first translator that powers the row wire and receiving an error signal at a second translator that powers the column wire;
   calculating a bit length as a function of factors that include learning rate, maximum activity, maximum error differential, and minimum weight update increment;
   calculating an activation scaling factor and an error scaling factor as functions of the bit length;
   scaling the activation signal in the first translator by the activation scaling factor and scaling the error signal in the second translator by the error scaling factor;
   by operation of the first and second translators, translating the scaled activation signal and the scaled error signal into first and second bit streams having bit lengths equal to the calculated bit length;
   applying the first bit stream to the row wire and applying the second bit stream to the column wire; and
   adjusting the conductivity of the RPU by interaction of the bit streams with the RPU.

2. The method of claim 1 wherein the first and second bit streams are stochastic.

3. The method of claim 2 wherein the bit length BL is a function of the learning rate $\eta$, maximum activity $x_{max}$, maximum error differential $\delta_{max}$, and minimum weight update increment $\Delta w_{min}$, given by:

$$BL = \operatorname{ceil}\left[\frac{\eta x_{max} \delta_{max}}{\Delta w_{min}}\right].$$

4. The method of claim 3 wherein the activation scaling factor $C_x$ and the error scaling factor $C_\delta$ are determined as functions:

$$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}}.$$

5. The method of claim 1 wherein the first and second bit streams are deterministic.

6. The method of claim 5 wherein the bit length BL is a function of the learning rate $\eta$, maximum activity $x_{max}$, maximum error differential $\delta_{max}$, and minimum weight update increment $\Delta w_{min}$, given by:

$$BL = \operatorname{ceil}\left[\frac{\eta x_{max} \delta_{max}}{\Delta w_{min}}\right].$$

7. The method of claim 6 wherein the activation scaling factor $C_x$ and the error scaling factor $C_\delta$ are determined as functions:

$$C_x = \sqrt{\frac{\eta \delta_{max}}{BL \Delta w_{min} x_{max}}} \text{ and } C_\delta = \sqrt{\frac{\eta x_{max}}{BL \Delta w_{min} \delta_{max}}}.$$

8. A neural network apparatus comprising:
   a plurality of row wires that are powered by first translators that receive neuron activation signals as inputs and produce first bit streams as outputs, wherein the first bit streams have a bit length that is calculated as a function of factors that include learning rate, maximum activity, maximum error differential, and minimum weight update increment;
   a plurality of column wires that are powered by second translators that receive error signals as inputs and produce second bit streams as outputs, wherein the second bit streams have the same bit length as the first bit streams; and
   a plurality of resistive processing units (RPUs), each connected between one of the row wires and one of the column wires, each RPU storing a weight as a conductivity of the RPU, wherein the conductivities of the RPUs are adjusted by interaction of the first and second bit streams with the RPUs.

9. The apparatus of claim 8 wherein the first and second bit streams are stochastic.

10. The apparatus of claim 9 further comprising a processor that calculates the bit length BL as a function of the learning rate $\eta$, maximum activity $x_{max}$, maximum error differential $\delta_{max}$, and minimum weight update increment $\Delta w_{min}$, given by:

$$BL = \operatorname{ceil}\left[\frac{\eta x_{max} \delta_{max}}{\Delta w_{min}}\right]$$

and transmits BL to the first and second translators.

11. The apparatus of claim 10 wherein the processor also calculates an activation scaling factor $C_x$ and an error scaling factor $C_\delta$, given by:

$$C_x = \sqrt{\frac{\eta \delta_{max}}{BL\Delta w_{min} x_{max}}} \text{ and } C_\delta = \sqrt{\frac{\eta x_{max}}{BL\Delta w_{min} \delta_{max}}},$$

and transmits the activation scaling factor $C_x$ to the first translators and transmits the error scaling factor $C_\delta$ to the second translators,
wherein the first translators scale the activation signals by the activation scaling factor before translating the scaled activation signals to the first bit streams,
wherein the second translators scale the error signals by the error scaling factor $C_\delta$ before translating the scaled error signals to the second bit streams.

12. The apparatus of claim 8 wherein the first and second bit streams are deterministic.

13. The apparatus of claim 12 further comprising a processor that calculates the bit length BL as a function of the learning rate q, maximum activity $x_{max}$, maximum error differential $\delta_{max}$, and minimum weight update increment $\Delta w_{min}$, given by:

$$BL = \text{ceil}\left[\frac{\eta x_{max} \delta_{max}}{\Delta w_{min}}\right]$$

and transmits BL to the first and second translators.

14. The apparatus of claim 13 wherein the processor also calculates an activation scaling factor $C_x$ and an error scaling factor $C_\delta$, given by:

$$C_x = \sqrt{\frac{\eta \delta_{max}}{BL\Delta w_{min} x_{max}}} \text{ and } C_\delta = \sqrt{\frac{\eta x_{max}}{BL\Delta w_{min} \delta_{max}}},$$

and transmits the activation scaling factor $C_x$ to the first translators and transmits the error scaling factor $C_\delta$ to the second translators,
wherein the first translators scale the activation signals by the activation scaling factor $C_x$ before translating the scaled activation signals to the first bit streams,
wherein the second translators scale the error signals by the error scaling factor $C_\delta$ before translating the scaled error signals to the second bit streams.

15. A method for operating a neural network that comprises a resistive processing unit (RPU) that is connected between a row wire and a column wire, the method comprising:
receiving an activation signal at a first translator that powers the row wire and receiving an error signal at a second translator that powers the column wire;
calculating a bit length as a function of factors that include learning rate, maximum activity, maximum error differential, and minimum weight update increment;
calculating an activation scaling factor and an error scaling factor as functions of the bit length;
scaling the activation signal in the first translator by the activation scaling factor and scaling the error signal in the second translator by the error scaling factor;
by operation of the first and second translators, translating the scaled activation signal and the scaled error signal into first and second bit streams having bit lengths equal to the calculated bit length;
applying the first bit stream to the row wire and applying the second bit stream to the column wire;
adjusting the conductivity of the RPU by interaction of the bit streams with the RPU; and
transmitting an input voltage to the RPU via the row wire and receiving an output current from the RPU via the column wire.

16. The method of claim 15 wherein the first and second bit streams are stochastic.

17. The method of claim 15 wherein the first and second bit streams are deterministic.

18. The method of claim 15 wherein the bit length BL of the first and second bit streams is determined as a function of the learning rate η, maximum activity $x_{max}$, maximum error differential $\delta_{max}$, and minimum weight update increment $\Delta w_{min}$, given by:

$$BL = \text{ceil}\left[\frac{\eta x_{max} \delta_{max}}{\Delta w_{min}}\right].$$

19. The method of claim 18 wherein the activation scaling factor $C_x$ and the error scaling factor $C_\delta$ are determined as functions:

$$C_x = \sqrt{\frac{\eta \delta_{max}}{BL\Delta w_{min} x_{max}}} \text{ and } C_\delta = \sqrt{\frac{\eta x_{max}}{BL\Delta w_{min} \delta_{max}}}.$$

20. The method of claim 15 wherein the activations and errors have floating point values.

* * * * *